(12) United States Patent
Li et al.

(10) Patent No.: US 8,805,661 B2
(45) Date of Patent: Aug. 12, 2014

(54) QUANTITATIVE CALCULATION METHOD FOR OIL (GAS) SATURATION OF FRACTURED RESERVOIR

(75) Inventors: Ning Li, Beijing (CN); Kewen Wang, Beijing (CN); Dexin Qiao, Beijing (CN); Qingfu Feng, Beijing (CN); Hongliang Wu, Beijing (CN)

(73) Assignee: PetroChina Company Limited, Beijing (CN)

( * ) Notice: Subject to any disclaimer, the term of this patent is extended or adjusted under 35 U.S.C. 154(b) by 282 days.

(21) Appl. No.: 13/379,706

(22) PCT Filed: Mar. 31, 2010

(86) PCT No.: PCT/CN2010/000420
§ 371 (c)(1),
(2), (4) Date: Dec. 21, 2011

(87) PCT Pub. No.: WO2010/148628
PCT Pub. Date: Dec. 29, 2010

(65) Prior Publication Data
US 2012/0109603 A1 May 3, 2012

(30) Foreign Application Priority Data

Jun. 22, 2009 (CN) .......................... 2009 1 0087474

(51) Int. Cl.
*G06G 7/48* (2006.01)
*G06G 7/50* (2006.01)
*E21B 47/10* (2012.01)
*E21B 47/00* (2012.01)
*E21B 47/12* (2012.01)
*E21B 49/00* (2006.01)

(52) U.S. Cl.
CPC ................. *E21B 47/10* (2013.01); *E21B 47/00* (2013.01); *E21B 47/12* (2013.01); *E21B 49/00* (2013.01)
USPC .............................................. 703/10; 703/9

(58) Field of Classification Search
CPC ..... G06F 17/10; G06F 2217/16; E21B 47/10; E21B 47/00; E21B 47/12; E21B 49/00
USPC ......................................................... 703/9–10
See application file for complete search history.

(56) References Cited

U.S. PATENT DOCUMENTS 4,517,836 A * 5/1985 Lyle et al. .................. 73/152.06
4,752,882 A * 6/1988 Givens ............................ 702/13
(Continued)

FOREIGN PATENT DOCUMENTS

CN 1040245 A 3/1990
WO WO 2006/063711 A2 6/2006

OTHER PUBLICATIONS

Jing, Xu-Dong, Alisdair Gillespie, and B. M. Trewin. "Resistivity index from non-equilibrium measurements using detailed in-situ saturation monitoring." Offshore Europe (1993).*

(Continued)

*Primary Examiner* — Aniss Chad
(74) *Attorney, Agent, or Firm* — Woodard, Emhardt, Moriarty, McNett & Henry LLP

(57) ABSTRACT

A quantitative calculation method for oil (gas) saturation of fractured reservoir during petroleum exploitation is provided. The method comprises: obtaining the fracture porosity and calculating resistivity index at different depth of fractured reservoir with known full diameter core data and imaging logging data; establishing the percolation network model of matrix and fracture combination with known pore structure feature; calibrating the numerical simulation results obtained from percolation network model based on the data of core experiment and sealed coring analysis results, then obtaining the relationship between the resistivity index (I) and water saturation (Sw) at different fracture porosity; calculating the oil (gas) saturation of fractured reservoir through selecting an interpolation function. The oil (gas) saturation calculated with said method is 0.67, however 0.49 with common method in some fractured reservoir. The accuracy is improved by more than 0.18 in the studied fractured reservoir.

11 Claims, 2 Drawing Sheets

(56) References Cited

U.S. PATENT DOCUMENTS

| | | | |
|---|---|---|---|
| 6,879,154 B2* | 4/2005 | Fleury | 324/303 |
| 7,825,659 B2* | 11/2010 | Georgi et al. | 324/303 |
| 8,311,789 B2* | 11/2012 | Eyvazzadeh et al. | 703/10 |
| 2006/0273788 A1* | 12/2006 | Georgi et al. | 324/303 |
| 2008/0133186 A1* | 6/2008 | Li et al. | 703/2 |

OTHER PUBLICATIONS

English Abstract of CN 1040295.

Kewen et al., "Percolation network modeling of electrical properties of reservoir rock", Acta Petrolei Sinica, vol. 28, No. 1, Jan. 2007.

Kewen et al., "Percolation Network Modeling of Electrical Properties of Reservoir Rock", Applied Geophysics, vol. 1.2, No. 4, Dec. 2005, pp. 13-19.

Li Dawei et al. "A Method Simulating Converted Wave Based on One-Way Wave Equation", OGP, 2008, 43 (5), pp. 583-588.

* cited by examiner

QUANTITATIVE CALCULATION METHOD FOR OIL (GAS) SATURATION OF FRACTURED RESERVOIR

CROSS-REFERENCE TO RELATED APPLICATIONS

This application is a National Stage of International Application No. PCT/CN2010/000420, filed Mar. 31, 2010, which claims the benefit of Chinese application No. 200910087474.3, filed on Jun. 22, 2009; all of the above-referenced applications are incorporated herein by reference in their entirety.

FIELD OF THE INVENTION

The invention relates to the field of petroleum exploitation, more specifically, to a quantitative calculation method for oil (gas) saturation of fractured reservoir, on the basis of calibrating numerical simulation results using data of core experiment and sealed coring, and in combination with dual laterolog and imaging logging data, in the fractured reservoir such as lava and carbonate rock.

DESCRIPTION OF THE ART

Terrestrially residual oil (gas) resources are mainly distributed in four domains including lithological formation reservoir, foreland basin reservoir, combination of middle and bottom of superimposed basin and mature basin, in which the lithological formation reservoir contributes to more than 60% of the newly increased reserves, and is thus the primary substitute domain for terrestrial petroleum mothball resources and the primary objective for increasing reserves. Substantial percentage of large-scale carbonate rock and lava oil and gas fields found in recent years are lithological formation reservoirs. These reservoirs often exhibit complex porous space with a variety of pores, such as vugs and fractures. Therefore, quantitative calculation of oil (gas) saturation of fractured reservoir is very important for improving exploration of lithological reservoir.

Up to now, electrical log, the representative of which is dual laterolog, is still the primary method for evaluating oil (gas) saturation. Evaluating oil (gas) saturation using the electrical log is generally performed on the basis of Archie and the extended formulas. In the fractured reservoir, extended formulas for calculating oil (gas) saturation of fractured reservoir are deduced from a simple fracture model. Research on calculating saturation of fractured reservoir is done in 'Interpretation Model and Evaluation Method of Well Logging in Fractured Reservoir' (1987, Petroleum Industrial Press) by Yandong Tan. Based on a simple fracture model, the author provides analytic expressions of resistivity and resistivity index of horizontally fractured, vertically fractured, and netted fractured rock. Liangxiao Zhao proposes a method for calculating saturation of a reservoir with fractures and pores in 'Evaluation Technique of Well Logging in Carbonate Rock Reservoir' (1994, Petroleum Industrial Press). In later research, quantitative calculation methods for saturation of fractured reservoir are all based on the classic methods described above.

There are three problems in the classic methods for calculating saturation of fractured reservoir. Firstly of all, the simple fracture model can not reflect the actual distribution characteristics of fractures in the reservoir. Secondly, the simple serial and/or parallel calculation method can not completely reflect the electrical properties of rock under the influence of fractures. The fractures' influence on the electrical properties of rock includes both the influence on electric transmission by the fractures per se, and electrical properties variation induced by the fractures' influence on the matrix saturation. Thirdly, these models often involve parameters such as fracture porosity index (mf), fracture saturation index (nf), and bound water saturation in the fracture (Sfb), ect., and accurate determination of these parameters is very difficult. In practice, there is a relatively large error between the calculation result of the classic saturation model in fractured reservoirs and the analysis result of sealed coring.

In addition, pure numerical simulation of the electrical properties of the fractured reservoir only reflects a rule of relative variation, which differs greatly from the actual reservoir, thus can not be used in practical log evaluation of the reservoir. Therefore, evaluation of oil (gas) saturation in fractured reservoir is one of the problems to be solved.

SUMMARY OF INVENTION

The object of the present invention is to provide a quantitative calculation method for oil (gas) saturation of fractured reservoir which can improve accuracy of well log evaluation of fractured reservoir.

For the above purpose, the present invention is implemented by the following steps S1-S7.

S1. The relationship between resistivity index (I) and water saturation (Sw) of the matrix is obtained on the basis of known full diameter core data; the real water (oil (gas)) saturation of undisturbed formation of the fractured reservoir is obtained on the basis of the known sealed coring data.

S2. The fracture porosities at different depth of the fractured reservoir is obtained by using the known imaging logging data. The resistivity indexes at different depth is calculated by using dual laterolog data combined with the analyzed core data.

The resistivity indexes at different depth described in step S2 is calculated as follows, resistivity of the undisturbed formation Rt takes the value from deep laterolog, and resistivity of the water-saturated formation R0 is calculated using the Archie formula on the basis of the porosity log in combination with the core analysis data.

The imaging logging data described in step S2 are data from full-bore micro-resistivity scanning imaging logging or acoustoelectric imaging logging data.

S3. A percolation network model including matrix and fracture is established according to known data on regional pore structural features, porosity and permeability, and the relationship between the resistivity index (I) and water saturation (Sw) in the fractured reservoir is determined by drainage modeling.

The percolation network model including matrix and fracture in step S3 is established by: determining the radiuses of pores and throats and their distributions, determining the connectivity between pores, and establishing three-dimensional pore structure model.

The regional pore structural features described in step S3 can be obtained from mercury porosimetry, nuclear magnetic resonance, and electron microscope.

When establishing the model described in step S3, parameters in the model, including radii and distribution, porosity, permeability of the matrix, are matched to the core analysis results.

S4. The numerical simulation results of the percolation network model is calibrated by using data on core experiment and the sealed coring.

The numerical simulation results in step S4 is calibrated as follows:

S4-1. The numerical simulation results when the fracture porosity is equal to 0 in step S3 are calibrated using core electrical experiment results (relationship of I-Sw) in the targeted interval. The detail method is adjusting parameters in the numerical simulation model to make that the numerical simulation results when the fracture porosity is equal to 0 are coincident with core electrical experiment results.

S4-2. Then, the simulation results in step S3 are calibrated using the water saturation analyzed from the sealed coring, the resistivity index at the corresponding depth calculated in step S2, and the fracture porosity at the corresponding depth calculated in step S1. The detail method is adjusting parameters in the numerical simulation model to make that the numerical simulation results under the fracture porosity corresponding to said depth are coincident with the results analyzed from the sealed coring.

The above simulation parameters mainly include pore structures, fluid properties, and the like.

S5. After calibration, the relationship between the resistivity index (I) and the water saturation (Sw) under different fracture porosities is obtained by numerical simulations; the fracture porosity described in step S5 takes a value between 0.1%-0.5%.

S6. A function between the resistivity index and the water saturation at different fracture porosities is obtained by interpolation; the optimal interpolation function described in step S6 is as follows:

$$I = ae^{bS_w^{-c}}$$

here, I is the resistivity index, $S_w$ is the water saturation, and a, b, and c are constants.

When the matrix porosity is 3% and the fracture porosity is 0.0%: a=0.03, b=3.44, c=0.52;

when the matrix porosity is 3% and the fracture porosity is 0.1%: a=0.06, b=2.70, c=0.52;

when the matrix porosity is 3% and the fracture porosity is 0.2%: a=0.20, b=1.47, c=0.67;

when the matrix porosity is 3% and the fracture porosity is 0.3%: a=0.38, b=0.85, c=0.77;

when the matrix porosity is 3% and the fracture porosity is 0.4%: a=0.52, b=0.53, c=0.91.

S7. The oil (gas) saturation of the fractured reservoir is calculated according to the fracture porosity obtained from step S2, by choosing an interpolation function in step S6.

An interpolation function described in step S7 is selected to choose a corresponding function between the resistivity index and water saturation. Water saturation and oil (gas) saturation at a certain depth are calculated on the basis of the resistivity index calculated in said step S2.

DETAILED DESCRIPTION

A specific embodiment of the present invention is described in detail with reference of the attached figures.

1. Full diameter core experiment and sealed coring analysis of the fracture reservoir are performed: the relationship between the resistivity index (I) and water saturation (Sw) of the matrix is obtained by analyzing data from the full diameter core experiment; real water (oil (gas)) saturation of the undisturbed formation of the fractured reservoir is obtained by analyzing the sealed coring data.

2. Fracture porosities at different depth of the fractured reservoir are obtained by dealing with imaging logging data (FMI, STAR, etc.). Resistivity indexes at different depth are calculated using dual laterolog data combined with the core analysis data. When calculating the resistivity index, resistivity of the undisturbed formation Rt takes the value from deep laterolog, resistivity of the water-saturated formation R0 is calculated using the Archie formula on the basis of porosity log in combination with the core analysis data.

Figure 1:
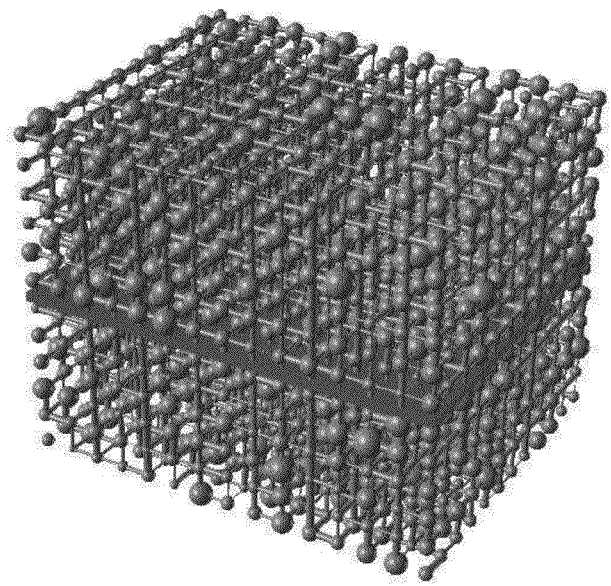
FIG. 1 is a view illustrating a pore structure model including matrix and fracture, wherein the middle portion represents a fracture, and the top and bottom portions represent matrix. In the matrix, all pore volumes are illustrated by balls, and all throats are illustrated in lines, wherein the size of a ball is corresponding to the size of a porous volume, and the thickness of a line is corresponding to the size of a throat.

3. A percolation network model including matrix and fracture in the studied region is established according to the pore structural features analysis data (such as mercury porosimetry, nuclear magnetic resonance, electron microscope, ect.) and the analyzed porosity, permeability data. The relationship between the resistivity index (I) and water saturation (Sw) in the fractured reservoir is studied by drainage modeling. When establishing the numerical model, parameters in the model, such as the radii and distribution of pores and throats, porosity, permeability, and so on, shall be substantially matched to the core analysis results. FIG. 1 is the established pore structure model of the fractured reservoir, in which the middle portion represents a fracture, and the top and bottom portions represent matrix. In the matrix, all pores are illustrated by balls, all throats are illustrated in lines, wherein the size of a ball is corresponding to the size of a pore, and the thickness of a line is corresponding to the size of a throat.

4. The numerical simulation results are calibrated using data of the core experiment and the sealed coring analysis. The simulation results when the porosity is equal to 0 are calibrated using core electrical experiment results of the targeted interval. The detailed implementation method is: the numerical simulation results when the fracture porosity is equal to 0 are set coincident with the results of the core electrical experiment (the rightmost curve in FIG. 2) by adjusting parameters in the numerical simulation model (parameters including the pore structure, fluid properties, and the like).

The simulation results are calibrated using the water saturation analyzed from the sealed coring, the resistivity index at the corresponding depth calculated in the above step 2, and the fracture porosity at the corresponding depth calculated in said step 1. The detailed method is: the numerical simulation results under the fracture porosity corresponding to said depth (the value is determined by the imaging logging) are set coincident with the results analyzed from the sealed coring (the leftmost curve in FIG. 2) by adjusting parameters in the numerical simulation model (parameters including the pore structure, fluid properties, and the like).

Figure 2:
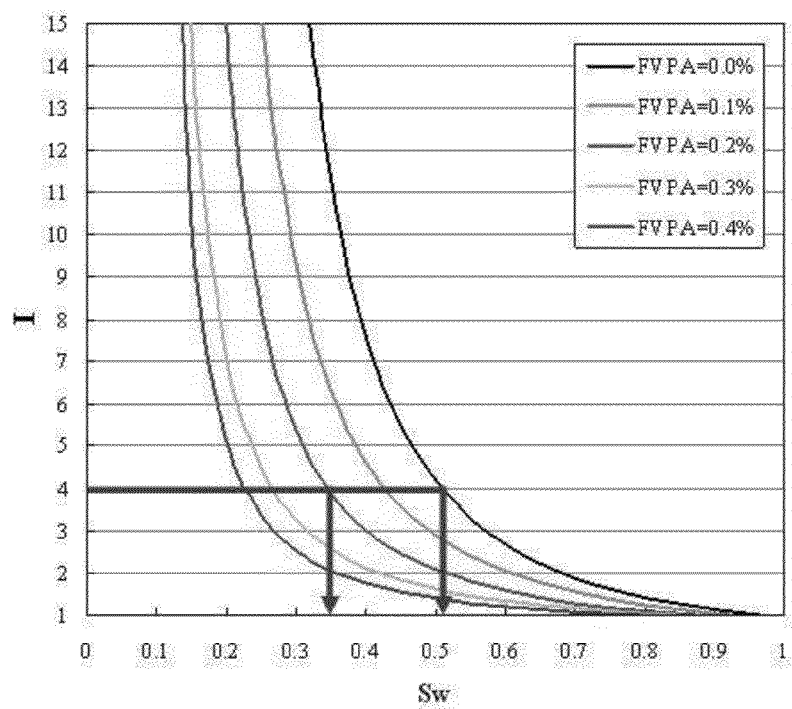
FIG. 2 illustrates the state where fracture porosity of a certain interval varies from 0% to 0.4% when the matrix porosity is 3%. The abscissa represents water saturation and the ordinate represents the resistivity index. In the figure, the rightmost curve is the experimental curve of water saturation versus the resistivity index obtained by core analysis when the fracture porosity is equal to 0. In the figure, the leftmost curve is the simulation result by calibrating the sealed coring analysis. Respective curves in the middle illustrate the relationship between the resistivity index and water saturation obtained by numerical simulation constrained by both the core analysis and the sealed coring analysis when the fracture porosity is 0.1%, 0.2%, and 0.3%, respectively.

5. After calibration using the core analysis and the sealed coring data analysis, simulations are performed again to obtain the relationship between the resistivity index (I) and the water saturation (Sw) under different fracture porosities. FIG. 2 illustrates the relationship between the resistivity index (I) and the water saturation (Sw) when the fracture porosity is 0.1%, 0.2%, and 0.3%.

6. An interpolation function between the resistivity index (I) and the water saturation (Sw) at different fracture porosities is established. Based on the simulation results illustrated in FIG. 2, the optimal relationship between the resistivity index (I) and the water saturation (Sw) is obtained by interpolation analysis:

when the fracture porosity is equal to 0.0%:

$$I=0.03e^{3.44S_w^{-0.52}} \quad (1)$$

when the fracture porosity is equal to 0.1%:

$$I=0.06e^{2.75S_w^{-0.52}} \quad (2)$$

when the fracture porosity is equal to 0.2%:

$$I=0.2e^{1.47S_w^{-0.67}} \quad (3)$$

when the fracture porosity is equal to 0.3%:

$$I=0.38e^{0.85S_w^{-0.77}} \quad (4)$$

when the fracture porosity is equal to 0.4%:

$$I=0.52e^{0.53S_w^{-0.91}} \quad (5)$$

Figure 3:
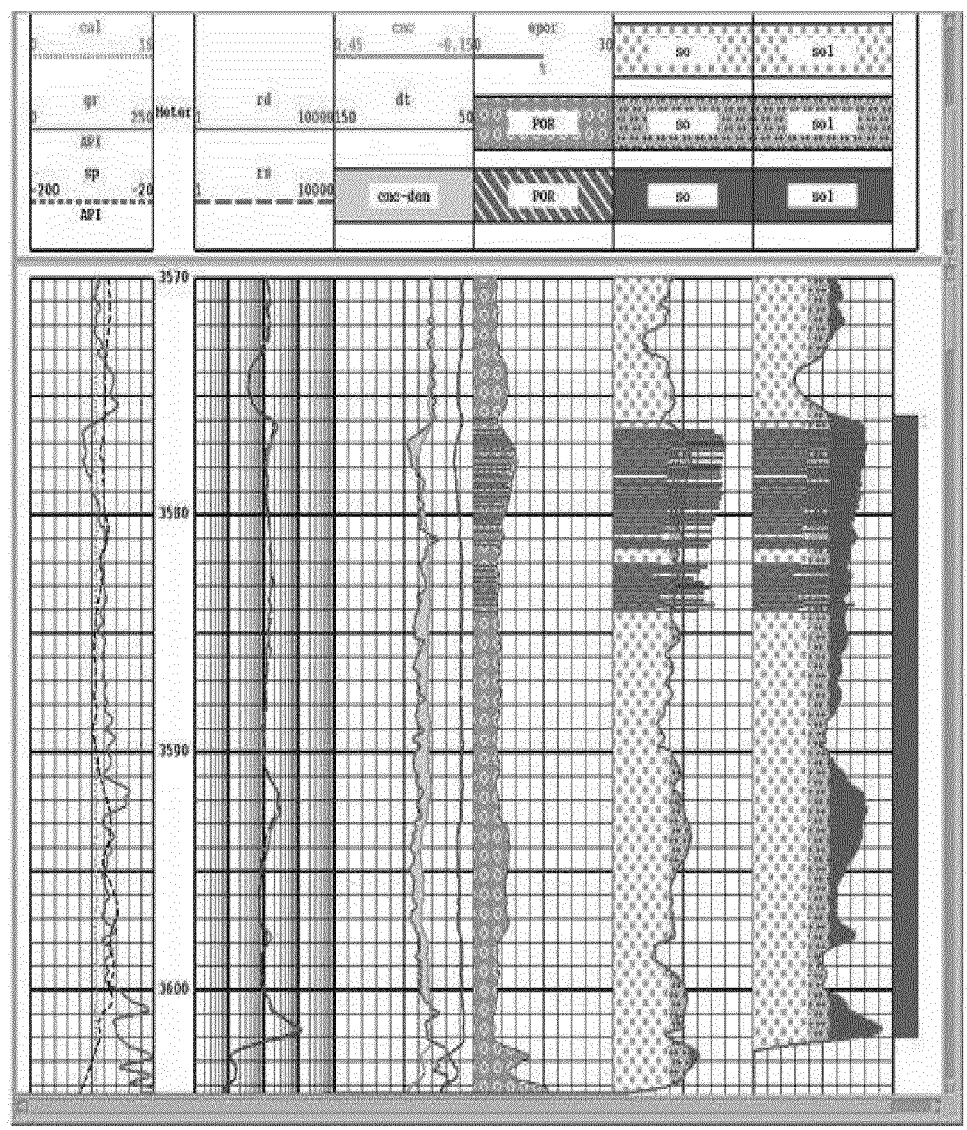
FIG. 3 is an example of well logging interpretation results of the quantitative calculation method for water (oil (gas)) saturation of fractured reservoir proposed in the present invention.

7. Oil (gas) saturation of the fractured reservoir is calculated. Quantitative calculation of the water (oil (gas)) saturation of the fractured reservoir is performed according to the fracture porosity obtained from the imaging logging data, the selected certain function between the resistivity index (I) and the water saturation (Sw) established previously, and the deep laterolog data. For example, according to analysis of the imaging logging data, fracture porosity at a certain depth is 0.1%, then the above formula (2) is chosen when calculating the oil (gas) saturation. FIG. 3 illustrates practically treated results in a certain interval in a certain well at Daqing oil field in China, in which the track next to the rightmost is the gas saturation interpretation results of a conventional fracture model, and the rightmost track is the gas saturation calculation result according to the method presented in this invention. By comparison, it can be seen that the gas saturation calculation result according to the method presented in this invention matches well to the analysis result of the sealed coring data.

Industrial Application

There are three problems in the conventional saturation calculation methods in the fractured reservoir. Firstly of all, the simple fracture model can not reflect the actual distribution rule of fractures in the reservoir. Secondly, the simple serial and/or parallel calculation method can not completely reflect the electrical properties of rock under the influence of fractures. The fractures' influence on the electrical properties of rock includes both the influence on electric transmission by the fractures per se, and electrical properties variation induced by the fractures' influence on the matrix saturation. Thirdly, these models often involve parameters such as fracture porosity index (mf), fracture saturation index (nf), and bound water saturation in the fracture (Sfb), ect., and the determination precision of these parameters is very difficult. In practice, there is a relatively large error between the calculation result of the classic saturation models in fractures and the analysis result of sealed coring.

In addition, pure numerical simulation of the electrical properties of the fractured reservoir only reflects a rule of relative variation, which differs greatly from the actual reservoir, thus can not be used in practical well logging evaluation of the reservoir. Therefore, evaluation of oil (gas) saturation in fractured reservoir is one of the problems to be solved.

Compared with the conventional saturation calculation models in the fractured reservoir, the present invention can greatly increase accuracy of oil (gas) saturation calculation in the fractured reservoir. When matrix porosity is 3%, fracture porosity is 0.2%, and the resistivity index is 4, oil (gas) saturation calculated by the conventional method is 0.49, whereas 0.67 by the method of the present invention, which is increased by 0.18.

What is claimed is:

1. A method for quantitatively calculating the oil and/or gas saturation of a fractured reservoir, comprising the steps of:
    a) taking full diameter core samples of a fractured reservoir of oil and/or gas and using those core samples to determine the relationship between the resistivity index (I) and the water saturation (Sw) of a matrix;
    b) performing sealed coring analysis of the fractured reservoir and obtaining data for the real water (oil (gas)) saturation of an undisturbed formation of the fractured reservoir from the sealed coring analysis data;
    c) obtaining fracture porosities at different depths in the fractured reservoir from known imaging logging data;
    d) calculating resistivity indexes at different depths using dual laterolog data combined with the core analysis data;
    e) establishing a percolation network model including matrix and fracture according to known regional pore structural features, and analyzed porosity and permeability data of a studied region, and determining the relationship between the resistivity index (I) and water saturation (Sw) in the fractured reservoir by drainage modeling;
    f) calibrating the numerical simulation results of the percolation network model using core experiment data and sealed coring analysis results;
    g) after calibration, determining the relationship between the resistivity index (I) and the water saturation (Sw) under different fracture porosities by numerical simulations;
    h) establishing an interpolation function between the resistivity index and the water saturation at different fracture porosities; and
    i) calculating the oil (gas) saturation of the fractured reservoir according to the fracture porosity obtained from step (c) by choosing an interpolation model from the resistivity index and the water saturation obtained in step (h).

2. The method of claim 1 wherein the resistivity indexes at different depths are calculated by having the resistivity of the undisturbed formation Rt take the value from deep laterolog, and the resistivity of the water-saturated formation R0 is calculated using the Archie formula on the basis of the porosity log in combination with the core analysis data.

3. The method according to claim 1 wherein the imaging logging data described in step (c) are data from full-bore micro-resistivity scanning imaging logging or acoustoelectric imaging logging data.

4. The method according to claim 1 wherein the percolation network model including matrix and fracture in step (e) is established by: determining the radii and distribution of pores, determining the radii and distribution of throats, determining the connectivity between pores, and establishing three-dimensional pore structure model.

5. The method according to claim 1 wherein the regional pore structure feature described in step (e) can be obtained by analyzing mercury porosimetry, nuclear magnetic resonance and electron microscope.

6. The method according to claim 1 wherein, when establishing the model described in step (e), one or more parameters in the model, including the radii and distribution of matrix pores, porosity, and permeability are matched to the core analysis results.

7. The method according to claim 1, characterized in that, the numerical simulation results in step (f) are calibrated as follows:

the numerical simulation results when the fracture porosity is equal to 0 in step (e) are calibrated using core electrical experiment results (relationship of I-Sw) of the targeted interval, specifically, the numerical simulation results when the fracture porosity is equal to 0 are set coincident with the results of the core electrical experiment results by adjusting parameters in the numerical simulation; and then the simulation results in step (e) are calibrated using the water saturation analyzed from the sealed coring analysis results, the resistivity index at the corresponding depth calculated in step (d), and the fracture porosity at the corresponding depth calculated in step (c), specifically, the numerical simulation results under some fracture porosity corresponding to said depth are set coincident with the results analyzed from the sealed coring analysis results by adjusting parameters in the numerical simulation.

8. The method according to claim 7 wherein the simulation parameters includes pore structure parameters and fluid property parameters.

9. The method according to claim 7 wherein the simulation parameters includes pore structure parameters and fluid property parameters.

10. The method according to claim 1, characterized in that, the fracture porosity described in step (g) takes a value from 0.1% to 0.5%.

11. The method according to claim 1, characterized in that the interpolation function described in step (h) is as follows:

$$I=ae^{bS_w^{-c}}$$

where, I is the resistivity index, Sw is the water saturation, and a, b, and c are constants; and wherein:

when the matrix porosity is 3% and the fracture porosity is 0.0%: a=0.03, b=3.44, c=0.52;

when the matrix porosity is 3% and the fracture porosity is 0.1%: a=0.06, b=2.70, c=0.52;

when the matrix porosity is 3% and the fracture porosity is 0.2%: a=0.20, b=1.47, c=0.67;

when the matrix porosity is 3% and the fracture porosity is 0.3%: a=0.38, b=0.85, c=0.77;

when the matrix porosity is 3% and the fracture porosity is 0.4%: a=0.52, b=0.53, c=0.91.

* * * * *